United States Patent [19]

Abram et al.

[11] Patent Number: 5,608,560
[45] Date of Patent: Mar. 4, 1997

[54] METHOD TRANSMITTING INFORMATION ENCODED IN BINARY FORM BY A TRAIN OF SOLITONS

[75] Inventors: Izo Abram, St. Cloud; Jean-Baptiste Thomine, Paris; Valuppilai Chandrakumar, Malakoff, all of France

[73] Assignee: France Telecom, France

[21] Appl. No.: 438,237

[22] Filed: May 9, 1995

[30] Foreign Application Priority Data

May 11, 1994 [FR] France ................. 94 05831

[51] Int. Cl.⁶ .................. H04B 10/04; H04B 10/12
[52] U.S. Cl. ............... 359/156; 359/188; 359/183; 359/173; 359/181
[58] Field of Search ................. 359/122, 156, 359/160–161, 173, 181, 183, 188

[56] References Cited

U.S. PATENT DOCUMENTS 5,388,088  2/1995  Gans et al. ................. 359/122

FOREIGN PATENT DOCUMENTS 0507508  10/1992  European Pat. Off. ........ H04L 12/56
0576358  12/1993  European Pat. Off. ............ 359/173
WOA9118455  11/1991  WIPO ........................... H04B 10/12

OTHER PUBLICATIONS

Electronics Letters, vol. 29, No. 13, 24 Jun. 1993, Stevenage GB, pp. 1176–1177.

*Primary Examiner*—Wellington Chin
*Assistant Examiner*—Kinfe-Michael Negash
*Attorney, Agent, or Firm*—Blakely Sokoloff Taylor & Zafman

[57] ABSTRACT

The method of transmitting a sequence of binary-coded information modulates the phase and the polarization of soliton pulses in such a manner that phase alternates between pairs of successive pulses, and the absolute value of the phase angle difference between two successive soliton pulses remains constant over the entire pulse train. The pulse train is transmitted by applying the method. Emission and reception apparatuses implement the method. The method is applicable to transmitting information over long distances.

9 Claims, 4 Drawing Sheets

Sequence n°1

Sequence n°2

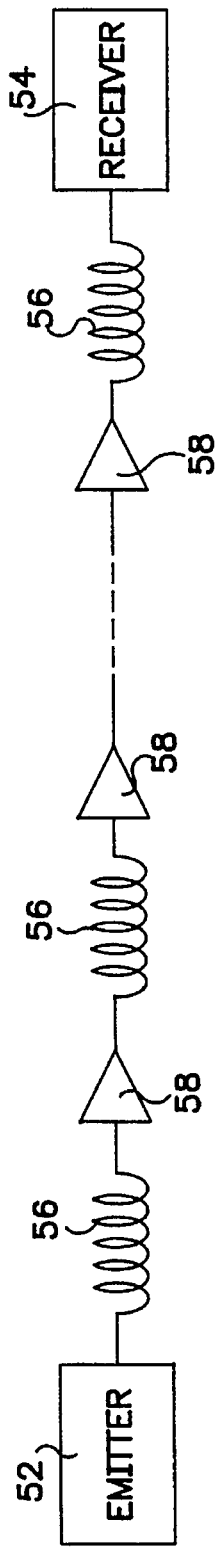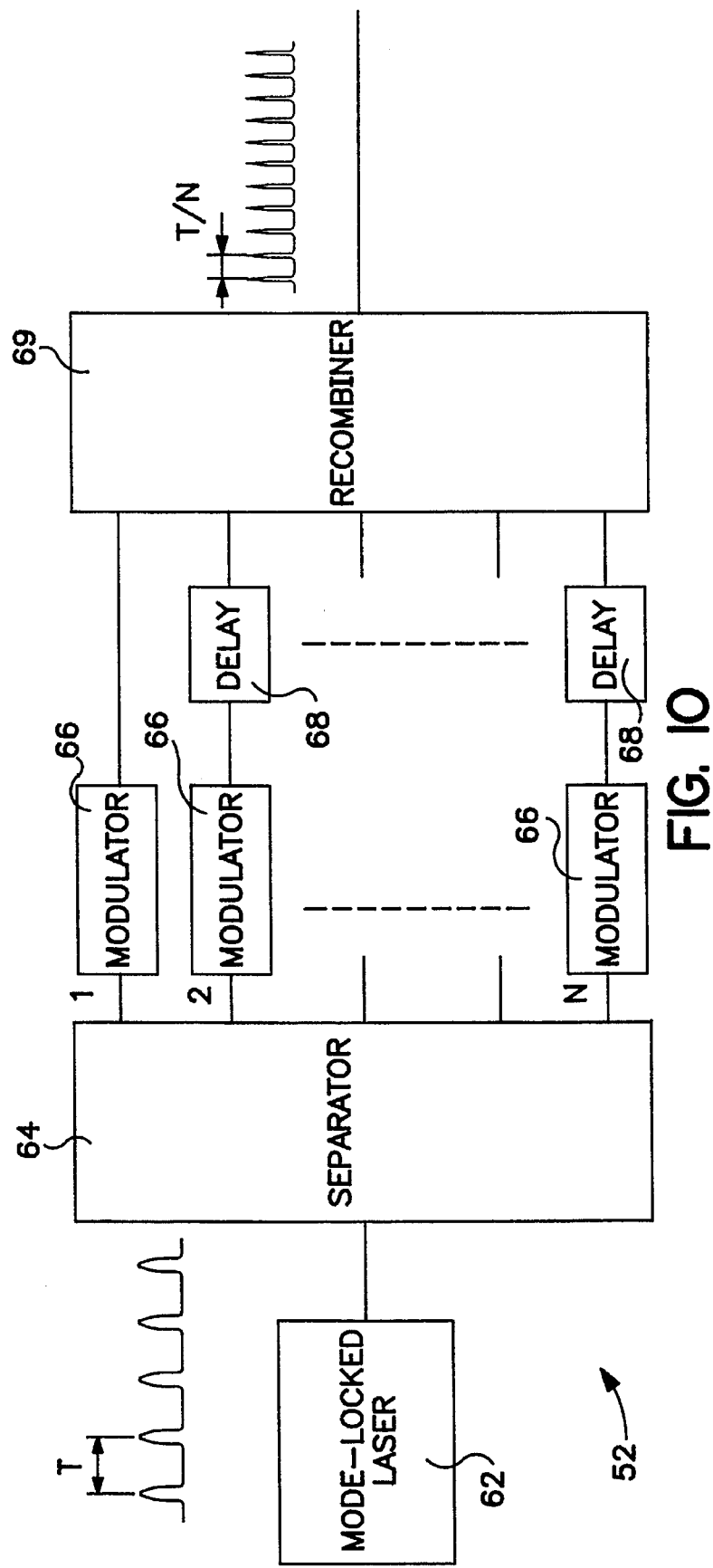

METHOD TRANSMITTING INFORMATION ENCODED IN BINARY FORM BY A TRAIN OF SOLITONS

FIELD OF THE INVENTION

The present invention relates to a method of transmitting information encoded in binary form by a train of short optical pulses of the "soliton" type, which pulses are capable of propagating over very long distances (of the order of a few thousands of kilometers) in an optical fiber system that includes optical amplifier relays. The invention also relates to such a train of soliton pulses, and to apparatuses for emitting and for receiving such a train.

BACKGROUND OF THE INVENTION

The arrival in 1987 of erbium-doped silica fibers has made it possible to develop high performance optical amplifiers capable of providing effective compensation for the losses suffered by light signals propagating along optical fibers in optical communications systems. Such erbium amplifiers are capable of replacing electronic repeaters, as have been used until now once every 50 km to 100 km for the purpose of regenerating (i.e. detecting and then re-emitting) optical pulses carrying digital information, thereby also eliminating the limitations on speed or on passband that have been imposed on optical communications by the in-line electronic components.

A particularly advantageous method of transmitting optical signals in systems that make use of optical amplifiers consists in transmitting solitons, which are optical pulses having pulse shape and intensity characteristics that are such that the two main sources of distortion in fibers, namely chromatic dispersion and non-linear refraction, cancel mutually. Solitons are therefore capable of propagating over thousands of kilometers without distortion of their shape, providing optical amplifiers are disposed periodically along the transmission line to inject energy into them for the purpose of compensating the attenuation losses they suffer during propagation.

Information corresponding to a sequence of "0" and "1" binary digits (known as "bits") can be encoded as a train of solitons by synchronizing the pulse rate with a clock which defines consecutive equal-time intervals (referred to as "windows" or as "bit-times") and by causing the state of the soliton occupying each bit-time to correspond to the binary value that is to be assigned thereto. The most commonly used kind of encoding consists in soliton on-off keying (OOK) in which the presence of a pulse during a bit-time corresponds to a "1" binary digit, whereas absence of a pulse corresponds to "0".

When signal attenuation is effectively compensated by in-line amplification (as is the case for trains of solitons), the reliability with which data is transmitted is generally limited by the presence of "noise", i.e. random fluctuations in the characteristics of the signal, e.g. its amplitude, its transmission speed, or its arrival time at the detector. In particular, fluctuations in the arrival time of solitons at the detector (known as soliton "jitter") can cause a soliton to be shifted into an adjacent bit-time, thereby giving rise to a data reception error. The reliability of a transmission system is characterized by its bit error rate (BER); in general, a BER of less than $10^{-9}$ is considered acceptable. For a soliton transmission line, jitter accumulation over the course of propagation implies that there exists some maximum propagation distance $L_{max}$ and some minimum bit-time (corresponding to a maximum soliton rate $B_{max}$) beyond which the error rate rises to values that are unacceptable, given the specifications of the communications system. These two parameters are often combined into a single measure of the performance of the soliton transmission system; this measure or "figure of merit" is constituted by the product BL.

There are two main sources of inaccuracy contributing to soliton position in a frame of bit-times. The first source is due to the interactions that occur between adjacent solitons. When two solitons are propagating along the same fiber, they are subject to mutual attraction or repulsion: the sign and the magnitude of this "force" depend on relationships of phase, of distance, and of polarization between two solitons. This interaction can change the relative distance between two solitons and can cause them to be "pushed" into adjacent bit-times. Although this interaction is deterministic, and although its effects can, in some cases, be taken into account and corrected on reception, the quasi-random nature of a sequence of bits has the consequence of causing displacements due to interaction between solitons to have the appearance of random jitter, thereby giving rise to reception errors. In present soliton transmission systems extending over several thousands of kilometers, these interactions are kept to a relatively low level by imposing a gap between two consecutive solitons that is 5 or 6 times greater than the duration LS of the solitons themselves. For example, with solitons of 18 ps duration, it is necessary to have gaps (or bit-times) of 100 ps or 110 ps so as to ensure that interactions remain small over distances of several thousands of kilometers. This limits the bit rate of binary information as transported by solitons having LS=18 ps to $B_{max}$=9 Gbit/s or 10 Gbit/s.

In this context, reference may advantageously be made to the following publication: [1] J. P. Gordon, "Interaction forces among solitons in optical fibers", Optics Letters, vol. 8, 596–598 (1983).

The second source of inaccuracy is noise of quantum origin that is injected during each amplification stage. This phenomenon has been described, in particular, in the following article: [2] J. P. Gordon and H. A. Haus, "Random walk of coherently amplified solitons in optical fiber transmission", Optics Letters, vol. 11, 665–667 (1986).

This noise consists in a random walk in the frequency of the soliton carrier wave, which, because of the chromatic dispersion of fibers, gives rise to random variation in soliton speed after each amplification stage, thus giving rise to "jitter", i.e. to random fluctuations in the arrival times of solitons at the detector.

Various techniques have recently been implemented to reduce soliton jitter and to increase transmission range, e.g. by introducing spectral filters or fast modulators at each amplification stage; proposals have also been made to use parametric amplification. Reference may advantageously be made to the various following publications: [3] A. Mecozzi, J. D. Moores, H. Haus, and Y. Lai, Optics Letters, vol. 16, 1841–1843 (1991); [4] Y. Kodama and A. Hasegawa, Optics Letters, vol. 17, 31–33 (1992); [5] L. F. Mollenauer, J. P. Gordon, and S. G. Evangelides, Optics Letters, vol. 17, 1575–1577 (1992); [6] M. Nakazawa, E. Yamada, H. Kubota, and K. Suzuki, Electronics Letters, vol. 27, 1270 (1991); [7] I. H. Deutsch and I. Abram, "Reduction of quantum noise in soliton propagation via phase sensitive amplification" Journal of the Optical Society of America (submitted for publication).

All of these techniques share two points in common: (1) they rely on in-line use of special components and (2) they are incapable of enabling soliton spacing to be reduced significantly below 6 LF.

An alternative technique which is based on compensating interactions between solitons in order to "stiffen" the train and impart a certain amount of jitter immunity thereto has also been proposed by Izo Abram in the European patent application filed under the number 93401616.3 and under the title "Procédé de transmission optique à très longue distance de solitons et système de transmission de mise en oeuvre de ce procédé" [A soliton method of very long distance optical transmission, and a transmission system implementing the method.

That technique consists in using trains of equidistant solitons in which adjacent solitons present phase alternation of π radians. That disposition ensures that the interactions between solitons are repulsive, thereby providing a "return force" whenever a soliton approaches one of its neighbors. This stabilizes the relative spacing of the solitons and fixes them in the bit-time frame.

In that proposal, encoding is performed by rotating soliton polarization through an angle, e.g. 45°, which preserves the repulsive nature of interactions between adjacent solitons to a very great extent.

Some of the advantages presented by that technique are the following: 1) It enables pulses to be moved closer together, to a spacing of 4 LS, which corresponds to an increase in bit rate while maintaining the other characteristics of the system constant; 2) no specialized equipment needs to be used in line other than the optical amplifiers that are already installed; and 3) it can be combined with one of the jitter-reduction techniques that are based on specialized equipment (e.g. the spectral filter technique), thereby enabling the advantages of two techniques to be combined.

Nevertheless, the technique of compensating interactions suffers from limitations when encoding is performed merely by rotating polarization, representing the digit "1" by rotation through 45°, while the digit "0" corresponds to the original polarization: adjacent solitons will have parallel polarization when they correspond to the same binary digit, whereas there will be an angle of 45° between them when two solitons represent different binary digits. More precisely, and taking account of the phase alternation between adjacent solitons, these situations correspond to angles of 180° and of 135° respectively between the electrical field vectors of two successive solitons. These polarization relationships imply that the repulsive force between two solitons representing the same binary digit is greater than the repulsive force between two solitons corresponding to different binary digits. This causes the repulsive forces between solitons to be out of balance and, on reception, Gives rise to jitter appearing, thereby limiting the effectiveness of the technique of compensating interactions.

OBJECTS AND SUMMARY OF THE INVENTION

The present invention proposes a method of encoding binary information that is adapted to soliton trains that have been "stiffened" by repulsive interactions between adjacent solitons; this encoding method preserves, to a very large extent, the balance of repulsive forces between solitons, for the purpose of increasing the range $L_{max}$, and the bit rate $B_{max}$, and/or of decreasing the error rate BER of the transmission.

The method of the invention is a method of transmitting an information sequence coded in binary form by means of a train of soliton type short optical pulses propagating along at least one optical fiber, in which the phase and the polarization of the pulses are modulated so that:

firstly, the phases of pairs of successive pulses alternate to ensure that the interactions between adjacent pulses are repulsive; and secondly, the polarization of the pulses corresponds to the binary values of the sequence to be transmitted.

More particularly, in the method of the invention the pulses are modulated in phase and in polarization in such a manner that the absolute value of the angle between the electric fields of two successive soliton pulses is constant over the entire train of soliton pulses.

In a preferred implementation, the angle between the electric fields of two successive pulses is equal to ±135°.

In an advantageous variant of the method, the pulses are modulated in phase and in polarization in such a manner that each of the two binary values "0" and "1" corresponds to a particular direction of rotation of the electric fields between a modulated pulse and the preceding pulse.

In another variant that is also advantageous, the pulses are modulated in phase and in polarization in such a manner that the pulse train is constituted by at least two interlaced sequences, the pulses in each sequence being polarized in two directions specific to each sequence, with each of said two directions corresponding to a respective binary value.

Preferably, the pulses are modulated in phase and in polarization to provide two interlaced sequences, the two polarization directions of each of the sequences being mutually perpendicular, and the polarization directions of one of the sequences being diagonal relative to the polarization directions of the other sequence.

Thus, with the method of the invention, there exists redundancy in the correspondence between the two binary digits ("0" and "1") and the orientations of the electric field of the solitons as used for representing said digits: each of the two digits corresponds to a plurality of orientations, and this makes it possible to choose between various possible orientations so as to keep the angle between the electric fields of adjacent solitons constant regardless of the sequence of binary values encoded on the train of solitons. This maintains equilibrium of the repulsive forces between adjacent solitons to a very large extent, and it imparts better jitter immunity to the train, thereby making it possible to increase the range $L_{max}$ and/or the data rate $B_{max}$ of reliable transmission.

The invention also proposes a train of solitons transmitted using such a method, and also emission or reception apparatuses for implementing the method.

BRIEF DESCRIPTION OF THE DRAWINGS

Other characteristics and advantages of the invention appear further from the following description. The description is purely illustrative and non-limiting. It should be read with reference to the accompanying drawings, in which:

FIG. 9 is a diagram representative of an optical link making use of trains of solitons between an emitter and a receiver;

FIG. 10 is a block diagram showing the general configuration of an emitter enabling a train of solitons to be produced and encoded in a manner that is stabilized in application of the invention, starting from a mode-locked laser that generates pulses at a rate which is less than a desired transmission rate.

MORE DETAILED DESCRIPTION

Figure 1:
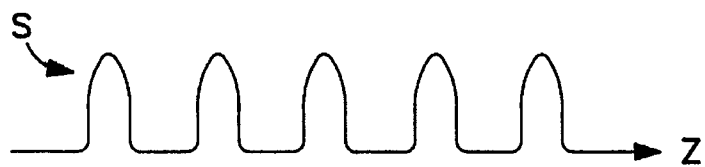
FIG. 1 is a diagram of a train of soliton pulses.

FIG. 1 shows a train of solitons S emitted along a propagation axis z.

Figure 2:
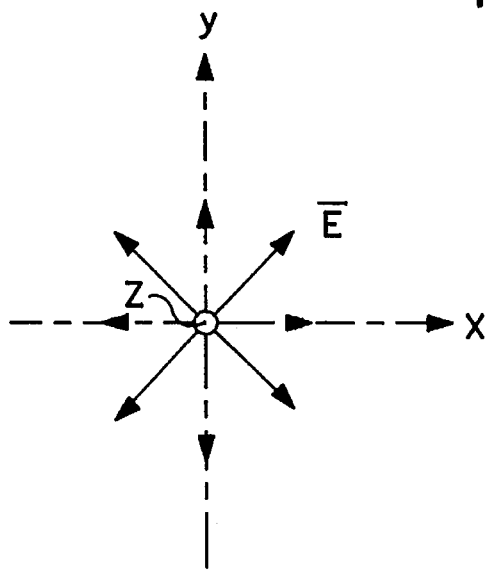
FIG. 2 shows the various orientations possible for the electric field of the soliton pulses in FIG. 1, as usable in particular implementations of the method of the invention.

In the particular implementations of the invention as described below, redundant encoding of the binary digits "0" and "1" is performed, as shown in FIG. 2, by 8 different orientations of the electric field E of the solitons (corresponding to 4 polarization values and 2 phase values), and in particular comprising the following angles: 0°, 45°, 90°, 135°, 180°, −135°, −90°, and −45°, which angle are measured from an x-axis, with 90° representing a y-axis, and with soliton propagation taking place along the z-axis. In the remainder of the present text, this 8-orientation redundant coding is referred to as "R8" coding.

One way of implementing R8 coding is "transition" coding, whereby the "0" or "1" value of the binary digit is contained in the direction through which polarization is rotated between adjacent solitons.

Figure 3:
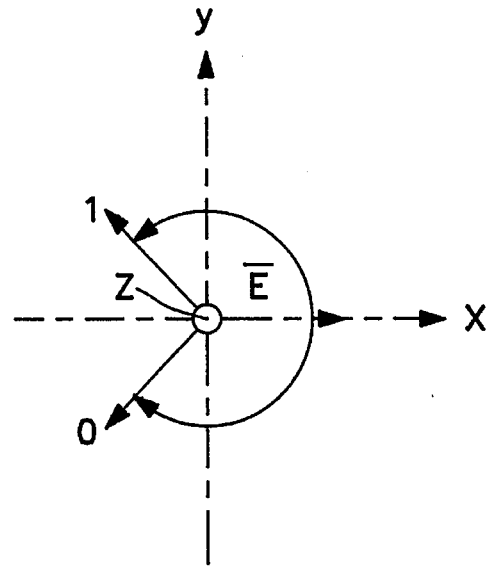
FIGS. 3 to 5 illustrate a possible implementation of the invention.

For example, the digit "0" may correspond to rotating the electric field of a soliton relative to the preceding soliton through −135°, whereas the "1" binary digit corresponds to rotating the electric field through +135°. Thus, if a first soliton is polarized on the x-axis, then the second will be polarized at −135° relative to the x-axis if it represents a "0" digit, and at +135° if it represents a "1" digit (FIG. 3).

Figure 4:
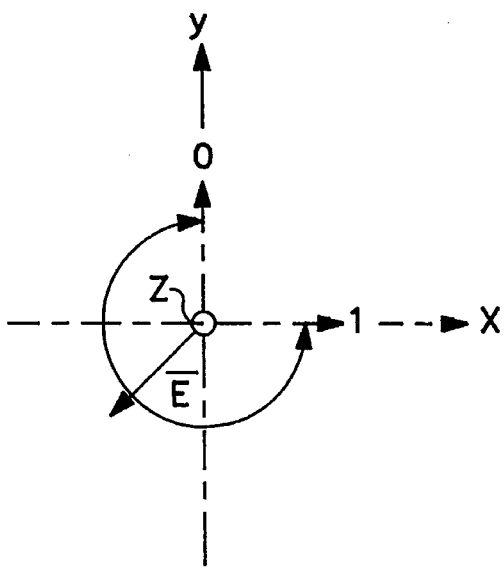
Figure 5:
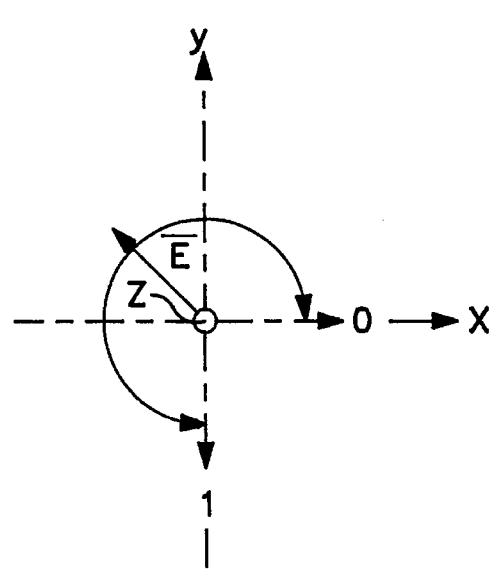

To encode a third soliton, polarization will be rotated from the polarization angle of the second soliton. Thus, if the second soliton represents "0", then the third soliton will be polarized either at 90° (−135°+135°) if it also corresponds to a "0", or else it will be polarized parallel to the x-axis (−135+135°=0) if it corresponds to the digit "1" (FIG. 4). Otherwise, if the second soliton corresponds to "1", then the third soliton will be polarized parallel to the x-axis (135°+ −135°=0°) if it corresponds to "0" and at −90° (135°+135°) relative to the x-axis if it represents "1", and so on for the following solitons (FIG. 5).

In theory, in order to receive such a train, it is necessary to have a phase-sensitive detector, such as a homodyne detector.

Nevertheless, there exists a variant of R8 coding for which reception can be performed by means of two intensity detector systems (direct detectors), e.g. comprising photodiodes, operating in a manner that is much simpler than that of homodyne detectors. In the description below, such coding is referred to as "R8DD" to emphasize the advantage presented by direct detection.

Figure 6:
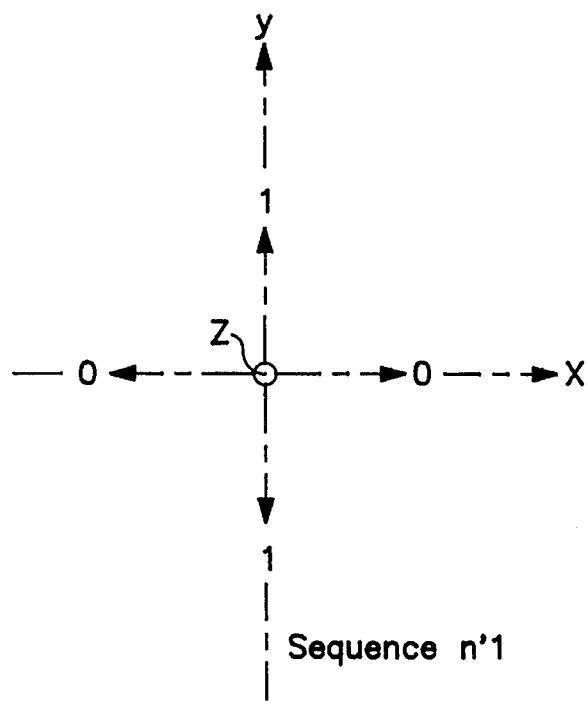
FIGS. 6 and 7 illustrate another implementation.

R8DD coding is based on the fact that when adjacent solitons have their electric fields relatively oriented by +135° or by −135°, then the solitons in odd positions of the train (first, third, fifth, . . . ) are always polarized along one of the x-axis and the y-axis (i.e. they correspond to the following orientations: 0°, 90°, 180°, −90°), whereas solitons in even positions (second, fourth, . . . ) are polarized along two "diagonal" directions (i.e. having the following orientations: 45°, 135°, −135°, −45°). The train can therefore be considered as being constituted by two distinct bit sequences (referred to below as "No. 1" and "No. 2") with the digits of the two chains being interleaved one to one. For each of these two sequences, the binary digits "0" and "1" correspond to soliton polarization as follows:

For sequence No. 1 as illustrated in FIG. 6, the binary digit "0" corresponds to a soliton polarized on the x-axis, whereas the binary digit "1" corresponds to y-axis polarization. For each of these two values, when account is also taken of the phase of the soliton (0 or π), the electric field of the soliton may be parallel or anti-parallel to the corresponding axis, thereby producing four possible values for coding two binary digits: in particular, for the digit "0", the electric field is at an angle of 0° or of 180° to the x-axis, whereas for the digit "1", it is at an angle of +90° or −90° thereto. During coding, the specific one of the two possible values for each bit is selected as a function of the preceding bit that belongs to sequence No. 2. Selection is performed in such a manner as to maintain an angle of 135° between successive bits.

Figure 7:
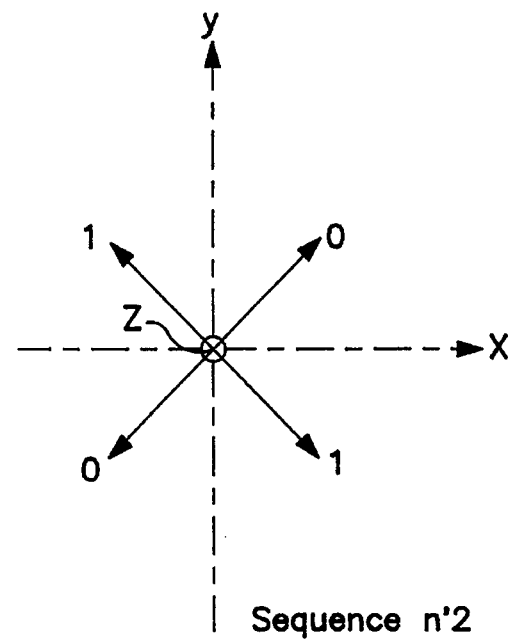

For sequence No. 2, as illustrated in FIG. 7, polarization is rotated through 45° relative to polarization for sequence No. 1, and a "0" digit corresponds to an electric field at an angle of 45° or −135° relative to the x-axis, whereas a "1" corresponds to an angle of 135° or −45° thereto. During coding, a specific one of the two possible values for each bit is selected as a function of the preceding bit which belongs to sequence No. 1, and in such a manner as to maintain an angle of 135° between two successive bits.

In particular, the angle through which rotation is to be performed on each bit is Given by the following formula:

$$A_n = A_{n-1} + (-1)^S \times 135 \qquad (1)$$

where $A_n$ is the polarization angle (in degrees relative to the x-axis) of the n-th bit, while S indicates the direction of rotation (S=0 to the right, S=1 to the left), and the value of S is given by:

$$S = (V_n - V_{n-1} + P_n)_{mod 2} \qquad (2)$$

where $V_n$ is the binary value coded on the n-th soliton ($V_n$=0 or 1), while $P_n$ is the parity of the soliton position, with $P_n$=1 for an odd position soliton (belonging to sequence No. 1) and $P_n$=0 for an even position soliton (belonging to sequence No. 2). This coding thus corresponds to transition coding where the direction rotation is positive for sequence No. 1 if two consecutive bits are different, whereas it is positive for sequence No. 2 if two consecutive bits are the same.

Figure 8:
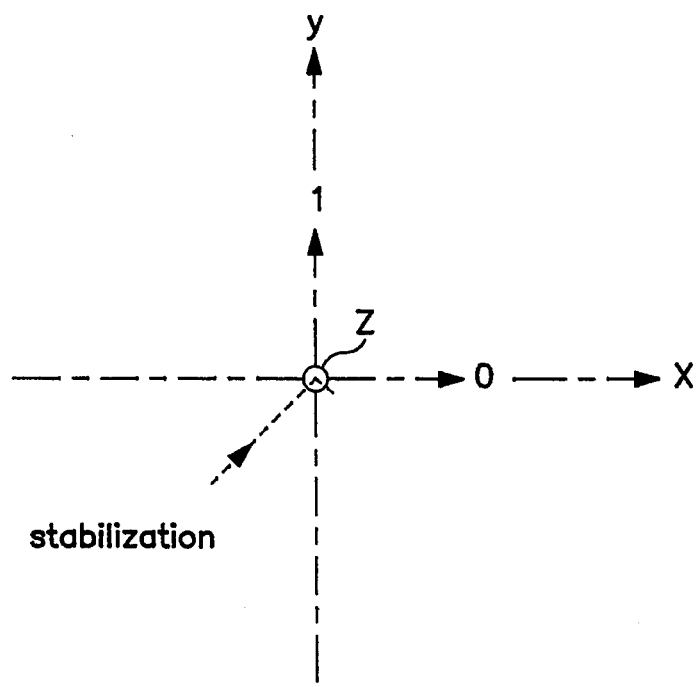
FIG. 8 illustrates a variant of the implementation showing FIGS. 6 and 7.

A special case of R8DD coding occurs when one of the two sequences (e.g. sequence No. 2) does not convey any information, and all of its bits take the value "0". Under such circumstances, as illustrated in FIG. 8, the solitons of sequence No. 1 are oriented at 0° or at 90° depending on respective "0" or "1" values, whereas the solitons of sequence No. 2 are always oriented at −135°. Such a train can be considered as being constituted solely by a sequence No. 1 which is encoded by 90° rotation of polarization, having additional solitons interspersed therein that do not convey any information, and whose sole function is to "stiffen" the train and reduce its jitter.

As described below in Greater detail, an R8DD train is received by using two direct detection assemblies, one for each sequence, each assembly having means for discriminating between the two orthogonal polarizations of the corresponding sequence. In particular, for sequence No. 1, when the received pulse is polarized along the x-axis, it is interpreted as a binary "0" digit, whereas if it is polarized parallel to the y-axis, it corresponds to the digit "1". If received light intensity is measured solely along the y-axis, then the received sequence corresponds to conventional OOK coding, in which the presence of a pulse in a bit-time corresponds to the digit "1", whereas the absence of such a pulse represents the digit "0". For sequence No. 2 detection, detection must distinguish between polarization at 45° and at 135°, corresponding respectively to binary "0" digits and to binary "1" digits, and the same considerations apply, mutatis mutandis.

A variant of the above-described detection method consists in measuring the difference between the light intensities on the two polarizations of each sequence. This technique produces a positive value (e.g. a positive voltage +V) for the digit "1" and a negative value (−V) for the digit "0". However, the detection assembly for either of the two sequences produces a zero value whenever it receives bits from the other sequence, since its solitons are polarized at 45° relative to the axes of the detection set. With differential detection, it is thus possible for the detection time window used with each sequence to be wider than that which is normally possible, since it can include the time allocated to bits of the other sequence without altering the value (+V or −V) corresponding to its own binary digits "1" or "0". This differential detection technique thus makes it possible to accept twice as much jitter, thereby making it possible to increase the range and/or the data rate available for reliable transmission.

The extent to which the performance of a soliton transmission system is improved by the proposed method will be understood on comparing the figure of merit constituted by the product BL (the product of transmission data rate multiplied by the maximum distance for which error rate remains acceptable, i.e. BER<$10^{-9}$), as applicable to various coding methods. Such a comparison has been performed for a system characterized by a silica fiber of sufficient length, and that includes an erbium-doped fiber every 40 km for the purpose of optically amplifying signals transmitted along the fiber. The mean dispersion of the fiber was D=0.4 ps/nm/km. In this comparison, the solitons taken into consideration were of 18 ps duration and had a peak power of 4.9 mW.

When the soliton train was coded using the conventional (OOK) method, the limit was imposed essentially by soliton jitter. Under such circumstances, the figure of merit was:

BL=60(Tbit/s) (km).

Such performance is achieved, for example, by a 9 Gbit/s train having a reliable transmission range $L_{max}$=6600 km.

For the method of stabilizing soliton trains by compensating interaction, with coding being performed by rotating polarization through 45°, the product BL can be raised as far as:

BL=80(Tbit/s) (km)

which corresponds, for example, to a 13 Gbit/s train propagating over $L_{max}$=6600 km.

For R8DD coding constituting an implementation of the present invention, and with a detection time window equal to the spacing between adjacent solitons, then the measured performance was:

BL=110(Tbit/s) (km)

achieved by propagating a 15 Gbit/s train over $L_{max}$=7500 km, and when the detection window was doubled by using differential devices, the measured performance was:

BL=125(Tbit/s) (km)

A differential detector thus makes it possible to lengthen the range of a 15 Gbit/s train to $L_{max}$=8400 km, and essentially doubles the performance of the soliton system compared with the performance achieved with conventional coding (OOK). This doubling of performance by using R8DD coding with differential detection is naturally equally applicable to systems using solitons having different characteristics (shorter duration solitons, use of fibers of different dispersion, inserting in-line spectral filters, etc.).

This optical communications method can be implemented using integrated components (or bulk optics) that are already in existence. Nevertheless, the development of specialized equipment may be necessary to optimize various stages, particularly for high data rate applications. By way of non-limiting example of the ways in which the method can be implemented, there follows a description of a system using R8DD coding that can be implemented using commonly-available optoelectronic components. All of the hardware elements mentioned below are well known to scientists and technicians working in the field, and the way in which they operate is not explained.

A long distance optical transmission is shown diagrammatically in FIG. 9. It comprises an emitter 52 and a receiver 54 that are interconnected by a line made up of monomode optical fibers 56. Optical amplifiers 58 are regularly distributed along the line.

To implement a method of the invention, an emitter 52 may comprise, for example, a mode-locked laser and an electro-optical modulator. The mode-locked laser emits a train of uniformly spaced apart light pulses that are rectilinearly polarized and whose shape, amplitude, phase, and polarization are all substantially identical.

Although mode-locked lasers often deliver pulses of Gaussian shape, such pulses, once launched into an optical fiber, can evolve towards the hyperbolic secant shape of a fundamental soliton as they propagate, providing their intensity exceeds a certain threshold.

The pulses making up the train are modulated in phase and in polarization by means of the electro-optical modulator. Its crystal axes are appropriately oriented relative to the polarization of the pulse train. Thus, such an electro-optical modulator can rotate polarization through 135° in application of equations (1) and (2) in order to implement the above-described R8DD coding (or the variant thereof that requires interposed "stabilization" pulses in the train).

FIG. 10 shows a variant that is better adapted to using commonly-available electronic components of relatively small passband (or speed). This emitter comprises a mode-locked laser 62 which emits pulses spaced apart at a period T compatible with the passband of the electronic components. The light pulse train is subdivided into N identical paths by a separator 64, each path including an electro-optical phase and polarization modulator 66. A relative delay of T/N is inserted between the N paths by devices 68: the optical pulses of the second path are delayed by T/N relative to those of the first path, the pulses of the third path are delayed by the same amount relative to those of the second path (i.e., by 2T/N relative to the first path) and so on, with the pulses of the N-th path being delayed by (N−1)T/N relative to the pulses of the first path. Thereafter, the N paths are recombined by a recombiner 69 to make up a single train, thereby producing a periodic train of period T/N which is N times shorter than the period of the original train.

Binary information is coded on each of the paths separately by phase and polarization modulation using the method described above, by means of the electro-optical modulator 66. For this purpose, the sequence of binary information to be coded is split up into groups of N consecutive bits. The first bit of the first group is then coded by the modulator of the first path, the second bit of the group is coded by the modulator of the second path, and so on, until all N bits of the group have been coded; thereafter, the following groups are coded in the same sequential manner with the n-th bit of each group always being coded on the n-th path. At the output of from this coding system, a train of solitons is obtained which is coded in application of the principles of the method of the invention.

Figure 11:
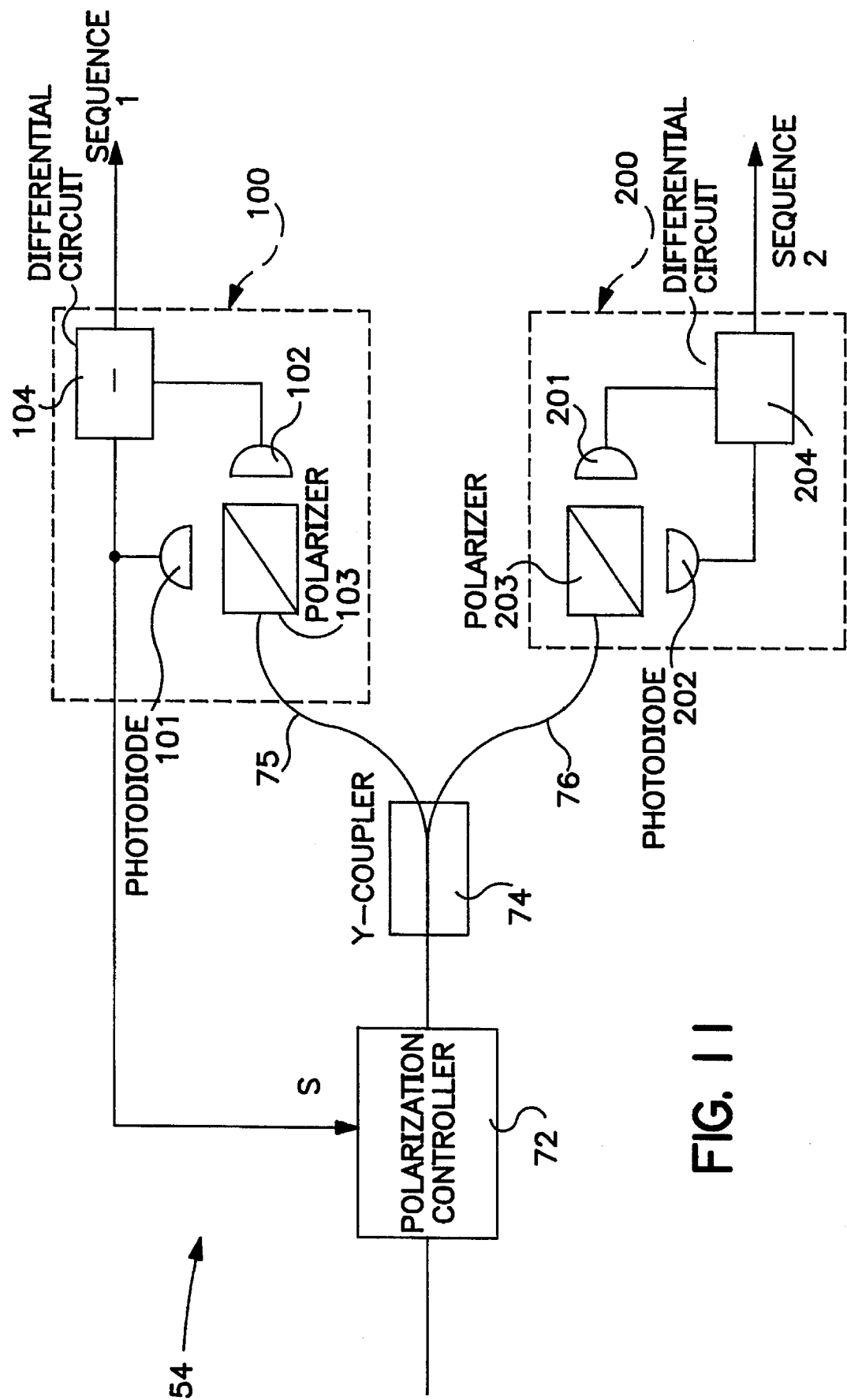
FIG. 11 shows apparatus of the invention for receiving encoded trains of soliton pulses.

An example of the system that can be used for receiving trains of solitons coded by a method in accordance with the invention, and more particularly coded using the R8DD coding method is described below with references to FIG. 11, the decoding being differential.

The receiver apparatus 54 is made up of two sets of components 100 and 200, one for each of the two sequences making up the train of solitons. At the inlet to the receiver apparatus 54, there is a polarization controller 72 driven by a signal a coming from one of the two sets 100 and 200. This polarization controller 72 rotates the polarization of received optical pulses so as to compensate for the random rotation of the polarization of the train as produced during propagation, and so as to ensure that, on reception, the solitons of the sequence 1 are always polarized along the x and y-axes for the components 100, while the solitons of the sequence 2 are always polarized along the two "diagonal" directions for the components 200.

At the outlet from the polarization controller 72, a Y-coupler 74 splits the incoming train into two identical trains and applies them via two respective optical fibers 75 and 76 to two sets of components 100 and 200, each set being constituted by a respective polarizer 103 or 203 and a pair of photodiodes referenced 101, 102 for 100 and 201, 202 for 200.

The train on the first fiber is applied to the polarizer 103 of the first set. This polarizer 103 splits the train into two orthogonal polarizations that are parallel to the mutually perpendicular x and y-axes, and the light intensity at each of the two outlets from said polarizer 103 is measured by means of respective photodiodes 101 and 102.

The fraction s of the signal produced by the photodiode 101 can be used to activate the polarization controller 72 so as to track random rotations in the polarization of the train by continuously maximizing the intensity of the signal delivered by the photodiode 101.

The output signals from the two diodes 101 and 102 are applied to a differential circuit 104 which produces a signal proportional to the difference between the light intensities corresponding to the two polarizations. This differential circuit 104 produces a non-zero signal when it receives a soliton belonging to sequence 1(corresponding to a positive voltage +V when it represents the binary digit "1", and a negative voltage −V when it corresponds to the binary digit "0"), whereas it produces a zero signal on receiving a soliton belonging to sequence 2, as described above.

The train on the second fiber 76 is applied to the second set of components 200. The polarizer 203 has its axes at an angle of 45° relative to the axes of the polarizer 103 so as to receive the solitons of sequence 2. The difference between the intensities of the two orthogonal polarizations output by the polarizer 203 is measured by means of two photodiodes 201 and 202 whose outputs are applied to a differential circuit 204. In this way, the set 200 produces, at the output of the circuit 204, a positive signal for a "1" digit in sequence 2, and a negative signal for the "0" digit in sequence 2, and it also produces a zero signal for solitons in sequence 1.

The electrical signals coming from the two sets (and corresponding to the two sequences making up the train) can subsequently be interlaced either by electronic means or else by computer means.

We claim:

1. A method of transmitting an information sequence coded in binary form by means of a train of soliton type short optical pulses propagating along at least one optical fiber, in which the phase and the polarization of the pulses are modulated so that:

firstly, the phases of pairs of successive pulses alternate to ensure that the interactions between adjacent pulses are repulsive; and secondly, the polarization of the pulses corresponds to the binary values of the sequence to be transmitted;

wherein the pulses are modulated in phase and in polarization in such a manner that the absolute value of the angle between the electric fields of two successive soliton pulses is constant over the entire train of soliton pulses.

2. A method according to claim 1, wherein the angle between the electric fields of two successive pulses is equal to ±135°.

3. A method according to claim 1, wherein the pulses are modulated in phase and in polarization in such a manner that each of the two binary values "0" and "1" corresponds to a particular direction of rotation of the electric fields between a modulated pulse and the preceding pulse.

4. A method according to claim 1, wherein the pulses are modulated in phase and in polarization in such a manner that the pulse train is constituted by at least two interlaced sequences, the pulses in each sequence being polarized in two directions specific to each sequence, with each of said two directions corresponding to a respective binary value.

5. A method according to claim 4, wherein the pulses are modulated in phase and in polarization to provide two interlaced sequences, the two polarization directions of each of the sequences being mutually perpendicular, and the polarization directions of one of the sequences being diagonal relative to the polarization directions of the other sequence.

6. A method according to claim 4, wherein one of the sequences is an interlaced stabilization sequence that does not convey information.

7. A transmitting apparatus for implementing the method according to claim 1.

8. A receiving apparatus for receiving a train of pulses transmitted by the apparatus of claim 7, including means to split said train of pulses into two identical pulse trains, two polarizers having axes that correspond to the polarization directions of the first and second sequences respectively, means for transmitting the separated pulse trains to each of said polarizers, two outlet photodiodes for each polarizer, a differential circuit receiving the outputs of said photodiodes, each polarizer splitting the train it receives into two orthogonal polarizations that it applies to respective ones of its two photodiodes, the differential circuit at the output of said photodiodes producing a signal proportional to the difference between the light intensities of said two orthogonal polarizations.

9. A receiving apparatus according to claim 8, including, at its inlet, a polarization controller controlled by a signal from one of the photodiodes or from one of the differential circuits.

\* \* \* \* \*

UNITED STATES PATENT AND TRADEMARK OFFICE
CERTIFICATE OF CORRECTION

| | | |
|---|---|---|
| PATENT NO. | : | 5,608,560 |
| DATED | : | March 4, 1997 |
| INVENTOR(S) | : | Abram et al. |

It is certified that error appears in the above-identified patent and that said Letters Patent is hereby corrected as shown below:

In column 3 at line 51 and column 6 at line 36, please delete " G " and insert -- g --.

In column 9 at line 24, please delete " signal a " and insert -- signal s --.

Signed and Sealed this

Fifth Day of August, 1997

*Attest:*

BRUCE LEHMAN

*Attesting Officer*     *Commissioner of Patents and Trademarks*